Aug. 19, 1958 H. J. WOLL 2,848,528

COLOR-CORRECTION SYSTEM

Filed July 30, 1953 2 Sheets-Sheet 1

INVENTOR.
HARRY J. WOLL

BY Morris A. Rabkin
ATTORNEY

Aug. 19, 1958 H. J. WOLL 2,848,528

COLOR-CORRECTION SYSTEM

Filed July 30, 1953 2 Sheets-Sheet 2

INVENTOR.
HARRY J. WOLL
BY Morris A. Rohkin
ATTORNEY

United States Patent Office 2,848,528

Patented Aug. 19, 1958

2,848,528

COLOR-CORRECTION SYSTEM

Harry J. Woll, Audubon, N. J., assignor to Radio Corporation of America, a corporation of Delaware Application July 30, 1953, Serial No. 371,371

27 Claims. (Cl. 178—5.4)

Figure 1:
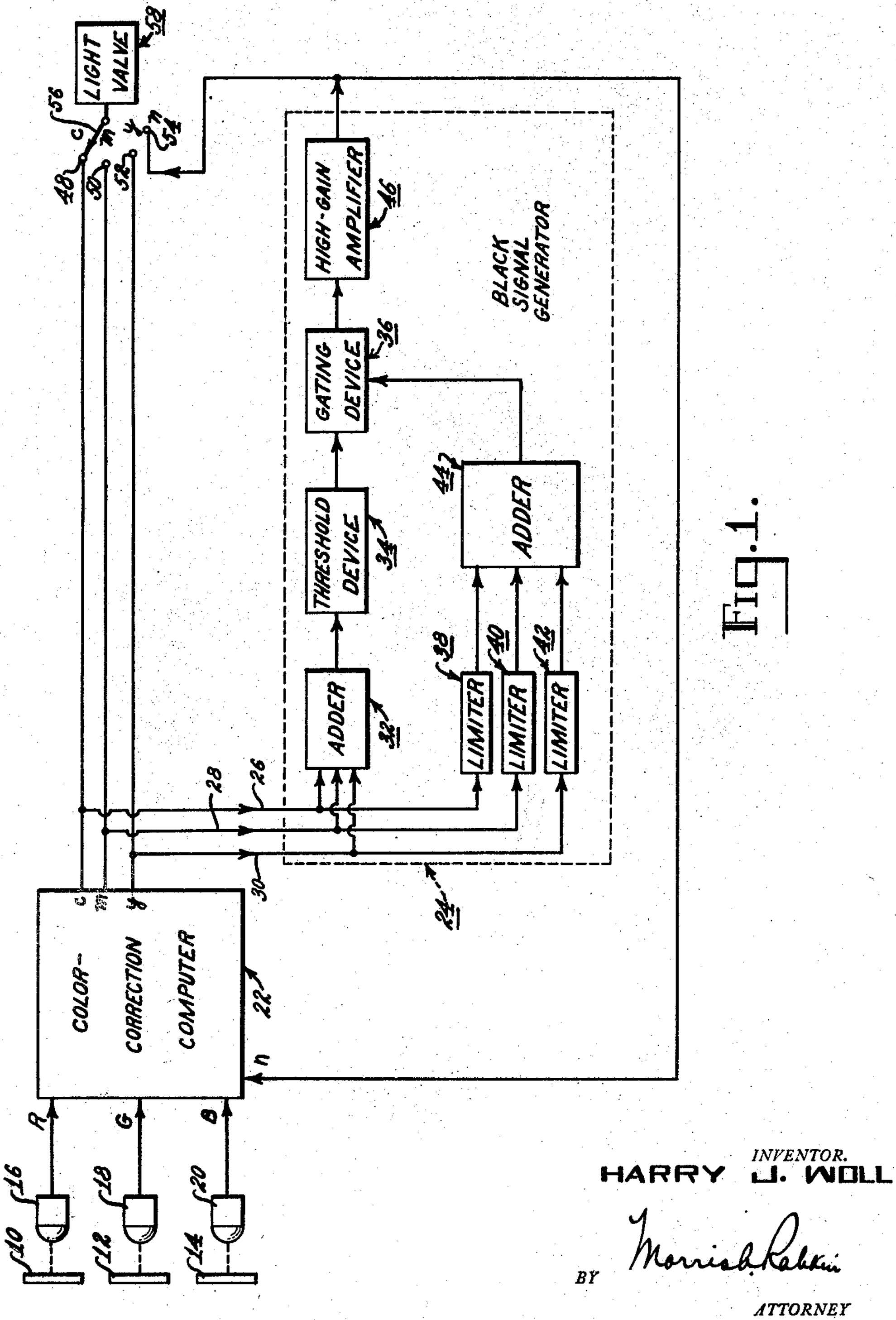

This invention relates to color-correction systems for color-reproduction processes, and more particularly to a system for obtaining a black plate for use in four-color reproduction.

A four-color system of reproducing a colored original by means of printing plates has been generally preferred. While it is theoretically possible to produce any color, within certain limits, by combining, in proper proportions, inks of the three subtractive primary colors, cyan, magenta and yellow, the use of the three primaries and black has a number of advantages. In a three-color system, the blacks and grays of the original are reproduced, by superimposing all three colored inks. However, due to deficiencies in the inks a good black cannot generally be produced by an overlay of the three primaries. In four-color printing, the use of black ink in addition to the primaries provides a greater brightness range. Other advantages of the four-color system are the saving of relatively expensive colored inks and sharper outlines and details in the printed reproduction.

In a four-color system, the colored original is scanned with a beam of light to produce three sets of electrical signals representative of the additive color primaries, red, green and blue. From these signals, four sets of corrected electrical signals are computed representative of the subtractive primaries and black. The corrected signals are then employed to control the intensity of a light source to expose four color-corrected negatives or "printers" that are used to make the printing plates.

In the past, it was proposed to print black ink where all three of the colored inks would be superimposed in the three-color system. To compensate for the addition of black ink, the undercolor that produced black was removed. A dot of black ink replaced the area of the smallest color dot, and the sizes of the other color dots were correspondingly reduced by the size of the black dot. One system for doing this is shown in the patent to Hall, No. 2,231,668. This type of system for preparing the color-corrected negatives has not given accurate results. As explained in the patent to Hardy et al., No. 2,434,561, the accurate computation of the black and subtractive primary dot sizes requires consideration of much more complex relationships among the dot sizes than the simplified theory implies. The Hardy patent discloses a system for computing the ink dot sizes that takes into account these complex relationships.

In the preparation of a black printer, it is not only desirable that theoretical requirements are met, but also that the practical requirements and preferences of the photoengraving and graphic arts are met. It has been found, for example, that it is preferred that black not be printed, or printed only in skeleton amounts, in certain instances even though all three of the subtractive primaries are present. Furthermore, these preferences are not uniform. It is apparent, therefore, that a system for preparing a black printer that can be readily adapted to carry out the varied requirements and preferences of the graphic arts is needed.

Accordingly, it is an object of this invention to provide a novel and improved system for producing a black printer.

Another object of this invention is to provide an improved and simple method and apparatus for producing, from a colored original, four color-corrected records corresponding to three primary colors and black.

Still another object of this invention is to provide a simple and economical system for color-correction computation that may be readily adapted to meet varied preferences and requirements in the amount of black to be printed.

Yet another object of this invention is to provide in a color-correction system a new and simple black signal generator for generating a signal representative of the black in a colored original.

These and other objects of this invention are achieved in a method and apparatus that is based on the practical requirement that the amount of undercolor removal, i. e., the replacing of a three-color overprint area with black, should vary with the brightness and chromaticity of the area under consideration. For practical purposes, black is present in areas of low brightness only if all three primaries are present and to an extent substantial enough to indicate low color saturation or purity. In an embodiment of this invention, there is employed a modified form of the color-correction computer disclosed in the Hardy patent noted above. The color-correction computer receives as inputs electrical signals representative of the three additive color primaries. These signals are produced by scanning color separations of the colored original. The outputs of the computer are electrical signals representative of the dot sizes of the three subtractive ink primaries, cyan, magenta, and yellow. The three sets of ink signals *c*, *m* and *y* are applied to three input channels in a black signal generator where they are added and applied to a fourth channel. The sum of the ink signals provides a rough inverse approximation of brightness. The signal sum $c+m+y$ increases as brightness decreases. Therefore, to avoid confusion, the quantity which is related to inverse brightness will be referred to in the following description as "darkness." The signal sum is then applied to a threshold device which limits signal passage to the excess of the sum over a predetermined threshold of darkness. A gating device controls the passage of the excess signal from the fourth channel to a high gain amplifier. A gating signal is produced only if ink signals are present in all three of the input channels, and if each of these signals is present in excess of a minimum amount. Thus, the gating signal provides a rough indication of a low level of saturation or purity. In the absence of these signal conditions, an inhibiting signal is produced that prevents the excess signal from passing through the gating device. When the threshold and gating devices permit the excess signal to pass into the amplifier, a black signal proportional to the excess signal is generated. The gain of the amplifier is the proportionality factor. The black signal is fed back into the computer to adjust the initial values of the ink primaries. The ink primary signals and the black signal then seek equilibrium values, dictated by the conditions set into the black signal generator and computer, and may be used to control the exposure of the color-corrected negatives or printers.

Figure 2:
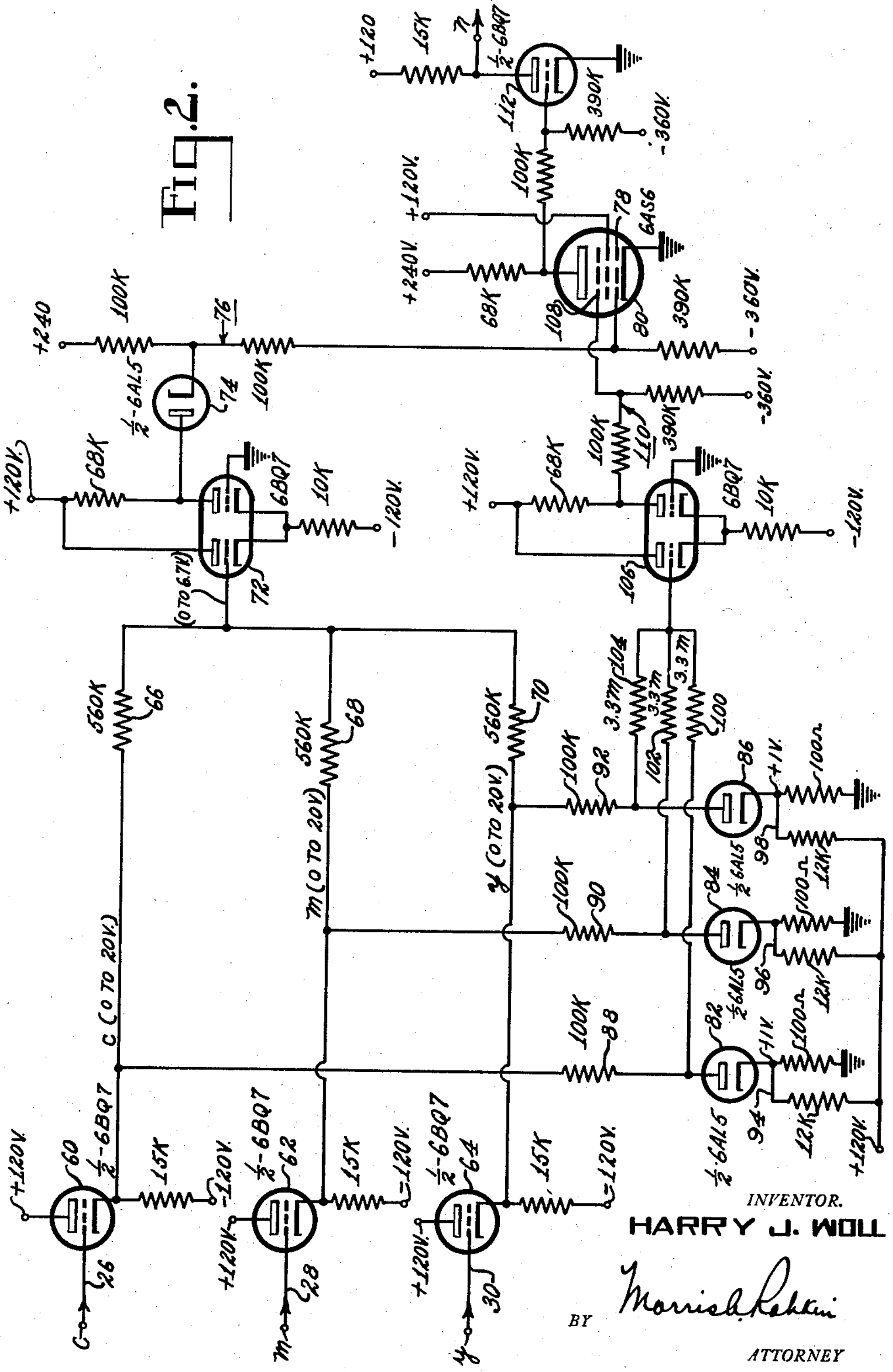

The novel features of this invention as well as the invention itself both as to its organization and mode of operation may be better understood from the following description when read together with the accompanying drawings in which:

Figure 1 is a block diagram of a color-correction system embodying this invention; and Figure 2 is a schematic circuit diagram of a black signal generator embodying this invention.

Referring now to Figure 1, there is shown a color-correction system embodying this invention. An original subject in color is scanned to provide the information from which color-corrected negatives and printing plates are made. The subject in color is shown in the form of three transparent color separation positives 10, 12 and 14. These positives may be made by photographing the original subject three times through three different filters, red, green and blue, so that the transparencies of the positives are characteristic of the corresponding colors of the original subject. A scanning light source (not shown) applies a narrow beam to corresponding areas of each of the uncorrected separations 10, 12 and 14. The light transmitted through the separations is converted to representative electric signals by different photocells 16, 18 and 20. These signals, representative of the primary color components red, green and blue of the subject, are applied as inputs to a color-correction computer 22. The computer may be the same as that disclosed in the patent to Hardy et al., noted above, except that the circuits used for generating a black signal in that computer are replaced by the black signal generator embodying this invention. The outputs of the color-correction computer 22 represent the subtractive primary colors cyan, magenta and yellow which will be referred to as *c*, *m* and *y*. These signals are proportional to the dot sizes of the inks to be used in a half-tone printed reproduction.

The output signals from the color-correction computer 22 are fed to a black signal generator 24 through three channels 26, 28 and 30, one for each color component. The signals in these channels are added to a first adder circuit 32, and the sum of the signals is then applied to a threshold device 34. This threshold device 34 passes the portion of the signal sum that is in excess of a predetermined limit. The excess signal from the threshold device 34 is fed to a gating device 36. The signals in the three channels 26, 28, and 30 are also applied to individual limiter circuits 38, 40, 42 which limit the signal in each channel to be not greater than a predetermined magnitude. The limited signals are added in a second adder circuit 44, and the output of the adder is applied as a control signal to the gating device 36. Signals passing through the gating device 36 are applied to a high gain amplifier 46, and the output of the amplifier 46 is then fed back as another input to the color-correction computer 22.

Consider the signals from the color-correction computer as representing 0% of full color for no signal, and 100% of full color for a maximum signal. These signals when summed in the first adder 32 provide a rough inverse indication of brightness. The larger the sum is, the greater the amount of color that is represented in the overlay of *c*, *m* and *y* and, therefore, generally the lower the brightness, or the greater the "darkness." The threshold device 34 provides a darkness threshold for the signal sum. The threshold device passes the signal sum only in excess of a predetermined magnitude which is 140% for this embodiment of the invention. Thus, the subtractive effects of *c*, *m* and *y* must result in a darkness level that is greater than that corresponding to 140% of full color for black to be printed. This is the first condition set into the black signal generator 24.

The limiter circuits 38, 40 and 42 are set to pass portions of signals from each channel 26, 28, and 30 that do not exceed a predetermined minimum, which is 5% for this embodiment. The sum of the signals passed by the limiter circuits 38, 40, and 42 produces a gating or an inhibiting signal depending upon its value. A gating signal is applied to the gating device 36 only if the signals that are fed to the three limiter circuits 38, 40 and 42 from all three channels are in excess of 5%; if signals in any one channel are less than 5% an inhibiting signal is applied. The gating and inhibiting signals are a rough indication of saturation or purity of color. If any of the ink signals are absent, or if they all do not exceed a substantial percentage of color, namely 5%, there is an indication of one of two conditions: First, the color saturation is relatively high and black should not be present; or, second, saturation may be low but the ink values are also so low that their sum does not exceed the darkness threshold. If the second condition exists, the darkness threshold device prevents the generation of black. If the first condition, high saturation, exists, an inhibiting signal blocks the gating device 36. However, if all three ink signals are present in substantial amounts, the saturation is low indicating that black should be present. In this case, a gating signal is produced to pass the excess darkness signal through the gating device to the high gain amplifier 46. The second condition set into the black signal generator 24 is that all three of the color components must be present in substantial amounts indicating a low saturation area.

The darkness and saturation signals together indicate the brightness and chromaticity of a given area, with the darkness signal in excess of the darkness threshold providing a measure of the amount of black, and the saturation signal functioning as a check. The excess darkness signal that is gated into the high gain amplifier 46 is amplified, and a proportional black signal *n* is generated. The gain of the amplifier 46 is the proportionality factor. The black signal is fed back to the color-correction computer 22 to reduce the initial values of *c*, *m* and *y* in accordance with the amount of black to be printed. The ink signals *c*, *m*, *y* and *n* seek equilibrium values in the feed back loop as dictated by the conditions set into the black signal generator 24 and the relationships in the computer 22.

The equilibrium values of the ink signals are taken as outputs at separate terminals 48, 50, 52 and 54 respectively connected to the *c*, *m*, and *y* channels 26, 28, and 30 and the output of the high gain amplifier 46. These outputs may be individually selected by a switch 56 and used to control a light valve 58 to expose four color corrected negatives in the usual manner.

The values of 5% and 140% for the saturation and darkness thresholds are merely exemplary and subject to variation with printing conditions, inks and preferences in the character of the reproduction. In addition the ink signals *c*, *m* and *y* may be given different weights when added in the first adder 32 to account for varied requirements and brightness effects of the different inks. Similarly, the limiting thresholds may be non-uniform to account for varied saturation effects of different inks. Both the thresholds and the gate may have gradual instead of sharp on-off characteristics, thereby generating a skeleton black plate in regions that would have no black if sharp on-off transitions were used.

In Figure 2 of the drawings, there is shown a schematic circuit diagram of a set of circuits that may be used for a black signal generator embodying this invention. In order to illustrate the operation of the circuit an appropriate set of component values and operating potentials are shown in the drawing for the particular case of 5% and 140% of saturation and darkness thresholds. The particular values shown are not intended to be a limitation on the invention.

The ink signals *c*, *m* and *y* from the color-correction computer are fed into cathode followers 60, 62 and 64 in individual color component channels 26, 28, and 30. The signals vary from 0 volts for no ink to 20 volts for full color for the specific circuit values shown. The darkness adder is made up of a simple network of resistors 66, 68 and 70, one for each color component. The signal from the darkness adder varies from 0 volts, when all colors are zero, to 6.7 volts, when all colors are full. This signal is then applied to an amplifier 72, the output of which is fed to a diode limiter 74. The bias on the diode 74 is adjusted to the predetermined threshold of darkness by a voltage divider 76. For the particular example shown, this diode 74 conducts when the sum of *c, m* and *y* is over 140%. Thus, the signal passed by the diode is proportional to $c+m+y-140\%$. This darkness signal is applied to the signal grid 78 of a gating amplifier 80, that is normally biased to cut off by the voltage divider 76.

The ink signals are also fed from the cathode followers 60, 62 and 64 to three diode limiter circuits made up of separate diodes 82, 84, 86 and resistors 88, 90, and 92. Separate voltage dividers 94, 96, 98 bias the cathodes of the diodes 82, 84 and 86 to the minimum thresholds. These limiter circuits limit the ink signal at the plates of the diodes to one volt. This one volt, which is 5% of the full signal of 20 volts, is added in a second network of resistors 100, 102 and 104 which produces an output of one volt if all three of the limited ink signals are over one volt, and an output of less than one volt if one or more of the limited signals are less than the minimum threshold. The saturation adder output is amplified in an amplifier 106 and applied to the gating grid 108 of the gating amplifier 80. The gating grid 108 is normally biased to cut off through a resistor divider 110 to inhibit passage of the darkness signal. The gate 80 is rendered conductive by a gating signal when the output of the second adder is one volt and passes the darkness signals to a high gain amplifier 112 which generates the black signal *n*. The output of the high gain amplifier 112 increases as the darkness signal increases because of the inversion of the gating amplifier 80. Thus, the black signal is directly proportional to the darkness signal that is in excess of the threshold. The black signal is zero if the sum of ink signals is less than 140%, or if any one of the ink signals is less than 5%. Where this invention is used with the color-correction computer disclosed in the patent to Hardy et al., noted above, the high gain amplifier 112 is not needed since the high gain amplifier shown in Figures 5 or 5*a* of that patent may be used.

The black signal generator of this invention is not restricted to employing the values of the subtractive ink primaries *c, m* and *y*. A black signal generator embodying this invention is also adapted to use the signals representing the additive color primaries, produced by scanning the original subject. In a similar manner, signals related to brightness and saturation may be produced, and combined to generate a signal proportional to the black in the original subject.

It may be seen from the above description of this invention that a simple, novel and improved system for producing a black printer is provided. The system may be readily adapted to meet varied preferences and requirements in the amount of black to be printed and, thus, control the character of the four-color reproduction.

What is claimed is:

1. In a system for obtaining color-corrected records from a subject in color by means of electrical signals representative of color components of said subject, the combination of a plurality of channels for carrying said signals with each channel arranged for carrying signals corresponding to a different color component, means for producing signals related to the brightness of said subject responsive to signals in all of said channels, means for producing signals related to the color saturation of said subject responsive to a combination signal including signals from all of said channels, and means responsive to said brightness and saturation signals for producing signals representative of the black of said subject.

2. In a system for obtaining color-corrected records from a subject in color by means of electrical signals representative of color components of said subject, the combination of a plurality of channels for carrying said signals with each channel arranged for carrying signals corresponding to a different color component, means coupled to all said channels for producing signals related to the brightness of said subject in response to signals in all of said channels, threshold means for limiting said brightness signals, means coupled to all said channels for producing signals related to the color saturation of said subject in response to a combination of signals simultaneously occurring in all of said channels, and means responsive to said limited brightness and saturation signals for producing signals representative of the black of said subject.

3. In a system for obtaining color-corrected records from a subject in color wherein a color-correction computer generates corrected electrical signals in accordance with uncorrected color component values of said subject, the combination therewith of a plurality of electrical channels for carrying said corrected signals with each channel arranged for carrying signals corresponding to a different color component, means fo producing signals related to the brightness of said subject in accordance with signals in all of said channels, means for producing signals related to the color saturation of said subject in accordance with signals in all of said channels, means including an amplifier responsive to said brightness and saturation signals for producing output signals representative of the black of said subject, means for feeding said black signals back to said color-correction computer, a plurality of output terminals, and separate means respectively coupling said output terminals to said channels and the output of said black signal producing means.

4. In a system for obtaining color-corrected records from a subject in color by means of electrical signals representative of color components of said subject, the combination of a plurality of initial channels arranged for respectively carrying said signals corresponding to different color components, a subsequent channel, means simultaneously coupling said subsequent channel to the output of all of said initial channels for receiving signals therefrom, said subsequent channel including means for limiting passage of signals therethrough, means for producing control signals only if signals are present in all of said initial channels, and means responsive to said control signals and to signals passed through said subsequent channel for producing signals representative of the black of said subject.

5. In a system for obtaining color-corrected records from a subject in color by means of electrical signals representative of color components of said subject, the combination as recited in claim 4 wherein said means coupling said subsequent channel to said initial channels includes means for adding signals in said initial channels, and said means for producing a control signal includes additional means for limiting signals from said initial channels.

6. In a system for obtaining color-corrected records from a subject in color by means of electrical signals representative of color components of said subject, the combination of a plurality of initial channels arranged for respectively carrying said signals corresponding to different color components, a subsequent channel coupled simultaneously to the output of all of said initial channels and receiving signals therefrom, and control means responsive to the simultaneous presence of minimum signals in all of said initial channels for controlling the conductive state of said subsequent channel.

7. In a system for obtaining color-corrected records from a subject in color by means of electrical signals representative of the primary color components of said subject, the combination of three electrical channels arranged for respectively carrying said electric signals corresponding to the primary colors, a fourth electrical channel, and means coupling said fourth channel simultaneously to the output of each of said three channels for receiving signals therefrom, said fourth channel including amplifier means at the output thereof and control means responsive to the simultaneous presence of signals of minimum magnitudes in all of said three channels, for rendering said fourth channel conductive to said amplifier means.

8. In a system for obtaining color-corrected records from a subject in color by means of electrical signals representative of the primary colors of said subject, the combination as recited in claim 7 wherein said means coupling said fourth channel to said three channels includes means for producing signals proportional to the sum of signals in said three channels, and said channel further includes means for passing only the portion of said sum signal in excess of a predetermined threshold.

9. In a system for obtaining color-corrected records from a subject in color wherein a color-correction computer generates corrected electrical signals representative of primary color components in accordance with uncorrected color component values of said subject, the combination therewith of three electrical channels arranged for respectively carrying said electrical signals corresponding to the primary colors, a fourth electrical channel, and means coupling said fourth channel to the output of each of said three channels, said fourth channel including amplifier means at the output thereof, means responsive to the presence of signals of minimum magnitudes in all of said three channels for rendering said fourth channel conductive to said amplifier means, and means for feeding back the output of said amplifier means to said color correction computer.

10. In a system for obtaining color-corrected records from a subject in color wherein a color-correction computer generates corrected electrical signals representative of primary color components in accordance with uncorrected color component values of said subject, the combination therewith of three electrical channels arranged for respectively carrying said electrical signals corresponding to the primary colors, a fourth electrical channel, and means coupling said three channels to said fourth channel, including means for producing signals proportional to the sum of signals in said three channels, said fourth channel including means for passing only the portions of said sum signals in excess of a predetermined threshold, an amplifier at the output of said fourth channel, control means responsive to the presence of signals of minimum magnitudes in all of said three channels for rendering said fourth channel conductive to said amplifier means, and means for feeding back the output of said amplifier as an input to said color-correction computer.

11. In a system for obtaining color-corrected records from a subject in color by means of electrical signals representative of primary color components of said subject, a black signal generator comprising three electrical channels arranged for respectively carrying said electrical signals corresponding to the primary colors, a resistor adder network for producing signals proportional to the sum of signals in said three channels, a limiter circuit for passing only the portions of said sum signals in excess of a predetermined threshold, three limiter circuits for respectively passing the portions of signals in said three channels in excess of a predetermined minimum, another adder circuit for producing a gating signal only if signals are passed by all of said three limiter circuits, an amplifier at the output of said fourth channel, and a gating circuit for rendering said fourth channel conductive to said amplifier in response to said gating signal.

12. The method of obtaining achromatic representative information from a subject in color by means of a plurality of component-color representative signals derived from said subject, said method comprising the steps of producing a brightness representative signal from said component-color representative signals, producing a color-saturation representative signal from the simultaneous occurrence of said component-color representative signals, and producing an achromatic representative signal from both said brightness representative signal and said color saturation representative signal.

13. Apparatus for producing achromatic representative information from a subject in color my means of component-color representative signals derived from said subject, said apparatus comprising a source of said component-color representative signals, a circuit for producing a brightness representative signal from said component-color representative signals, a circuit for producing a color-saturation representative signal from all of said component-color representative signals occurring simultaneously, and a circuit for producing an achromatic representative signal from said brightness representative signal and said color-saturation representative signal, wherein said circuits are arranged to produce said achromatic representative signal only in the presence of all of said component-color representative signals.

14. Apparatus for producing achromatic representative information according to claim 13, wherein said circuits are arranged to produce said achromatic representative signal only when each of said component-color representative signals exceeds a respective predetermined value.

15. Apparatus for producing achromatic representative information according to claim 13, wherein said circuit for producing said brightness representative signal comprises means for combining said component-color representative signals.

16. Apparatus for producing achromatic representative information from a subject in color by means of component-color representative signals derived from said subject, said apparatus comprising a source of said component-color representative signals, a circuit for producing a brightness representative signal from said component-color representative signals, a circuit for producing a color-saturation representative signal from all of said component-color representative signals occurring simultaneously, and a circuit for producing an achromatic representative signal from said brightness representative signal and said color-saturation representative signal, wherein said circuit for producing said color-saturation representative signal comprises means for combining said component-color representative signals.

17. Apparatus for producing achromatic representative information according to claim 16, wherein said circuit for producing said color-saturation representative signal comprises means for limiting each of said component-color representative signals to respective predetermined values prior to being passed to said color-saturation representative signal producing circuit combining means.

18. In a system for obtaining color corrected records from a subject having color characteristics wherein apparatus produces a plurality of corrected color-component signals in accordance with a plurality of uncorrected color-component signals derived from said subject and in accordance with signals representative of the black of said subject, the combination with said apparatus of means for producing signals related to the brightness of said subject in accordance with a plurality of simultaneously occurring said color-component signals, means for producing signals related to the color saturation of said subject in accordance with a plurality of said simultaneously occurring color-component signals, means for producing signals representative of the black of said subject in accordance with said brightness and color saturation signals, and means for applying said black signals to said corrected signal producing apparatus.

19. In a system for obtaining color corrected records from a subject having color characteristics wherein apparatus produces a plurality of corrected color-component signals in accordance with a plurality of uncorrected color-component signals derived from said subject and in accordance with signals representative of the black of said subject, the combination with said apparatus of means for producing first signals in accordance with a plurality of simultaneously occurring said color-component signals, means for producing second signals in accordance with a plurality of simultaneously occurring said color-component signals, means for producing signals representative of the black of said subject in accordance with said first and second signals, and means for applying said black signals to said corrected signal producing means.

20. The combination as recited in claim 19 wherein at least one of said first and second signal producing means receives said plurality of corrected color-component signals and is operable in accordance therewith.

21. In a system for obtaining color corrected records from a subject having color characteristics wherein apparatus produces a set of corrected signals corresponding to different color components in accordance with a set of uncorrected signals corresponding to different color components, said uncorrected signals being derived in accordance with the color characteristics of said subject, the combination with said apparatus of means for producing first signals in accordance with all of one of said sets of signals and only when all occur simultaneously, means for producing second signals in accordance with all of one of said sets of signals, and means for producing signals representative of the black of said subject in accordance with said first and second signals.

22. In a system for obtaining color corrected records from a subject having color characteristics wherein apparatus produces a set of corrected signals corresponding to different color components in accordance with a set of uncorrected signals corresponding to different color components, said uncorrected signals being derived in accordance with the color characteristics of said subject, the combination with said apparatus of means for producing first signals in accordance with all of one of said sets of signals and only when all occur simultaneously, means for producing second signals only when each of said component-color signals of one of said sets exceeds a certain value, and means for producing signals representative of the black of said subject in accordance with said first signals only upon the production of said second signals.

23. Apparatus for producing achromatic representative information from a subject having color characteristics by means of component-color representative signals derived from said subject, said apparatus comprising a circuit for producing a brightness representative signal from said component-color signals only when all occur simultaneously, a circuit for producing a color-saturation representative signal from said component-color signals, and a circuit for producing an achromatic representative signal from said brightness signal and said color-saturation signal with said achromatic signal being primarily controlled by said brightness signal under the condition of said color-saturation signal being representative of a low level of color saturation and with said achromatic signal being produced at an extreme value under the condition of said color-saturation signal being representative of a high level of color saturation.

24. In a system for obtaining color corrected records from a subject having color characteristics wherein apparatus produces a set of corrected signals corresponding to different color components in accordance with a set of uncorrected signals corresponding to different color components, said uncorrected signals being derived in accordance with the color characteristics of said subject, the combination with said apparatus of means for producing a signal representative of brightness in accordance with the signals of one of said sets, means for producing a signal representative of color saturation in accordance with the signals of one of said sets only when all signals of said one set occur simultaneously, and means responsive to said brightness and color-saturation signals for producing a signal representative of the black of said subject with the magnitude of black represented by said black signal being in accordance with said brightness signal under the condition of said color-saturation signal being representative of a low level of color saturation and with said black magnitude being substantially a minimum value under the condition of said color-saturation signal being representative of a high level of color saturation.

25. In a system for obtaining color corrected records from a subject having color characteristics wherein apparatus produces a set of corrected signals corresponding to different color components in accordance with a set of uncorrected signals corresponding to different color components, said uncorrected signals being derived in accordance with the color characteristics of said subject, the combination with said apparatus of means for producing a first signal in accordance with all of one of said sets of signals only when all signals of said one set occur simultaneously, means for producing a second signal in accordance only with those of said component-color signals of one of said sets that are beyond a certain value, and means responsive to said first and said second signals for producing a signal representative of the black of said subject.

26. A method of obtaining a black printer record for color reproduction from a subject having color characteristics, said method comprising the steps of deriving information as to the color characteristics of said subject with respect to certain component colors, deriving information as to the brightness of said subject by combining simultaneously said color characteristic information, determining whether a low color saturation state is to be reproduced by determining whether certain values of all of certain component colors are to be reproduced, and recording a black printer record having black values substantially in accordance with said brightness information under the condition of the color saturation state to be reproduced being said low color saturation state and having a substantially minimum black value under the condition of said color saturation state to be reproduced being a high color saturation state.

27. A black printer record for use in the reproduction of a subject having color characteristics, said record having black values substantially in accordance with the brightness of the subject to be reproduced under the condition of the color saturation state to be reproduced being a low color saturation state indicated by the sum of values representing simultaneously all of the colors to be reproduced being greater than a certain value, and having a substantially minimum black value under the condition of the color saturation to be reproduced being a high color saturation state.

References Cited in the file of this patent

UNITED STATES PATENTS

| | | |
|---|---|---|
| 2,253,086 | Murray | Aug. 19, 1941 |
| 2,413,706 | Sunderson | Jan. 7, 1947 |
| 2,434,561 | Hardy | Jan. 13, 1948 |
| 2,560,567 | Sunderson | July 17, 1951 |
| 2,691,696 | Yule | Oct. 12, 1954 |
| 2,710,889 | Tobias | June 14, 1955 |
| 2,721,892 | Yule | Oct. 25, 1955 |
| 2,748,190 | Yule | May 29, 1956 |